United States Patent [19]

Selinko

[11] 4,083,481
[45] Apr. 11, 1978

[54] DETACHABLE MOUNTING CLIP ARRANGEMENT FOR MINIATURE PORTABLE APPARATUS OR THE LIKE

[75] Inventor: George Joseph Selinko, Lighthouse Point, Fla.

[73] Assignee: Motorola, Inc., Schaumburg, Ill.

[21] Appl. No.: 776,324

[22] Filed: Mar. 10, 1977

[51] Int. Cl.² ............................................... A45F 5/02
[52] U.S. Cl. ................................. 224/5 H; 224/26 R; 325/118; 24/3 R
[58] Field of Search ............ 224/5 H, 5 R, 5 A, 26 R, 224/26 B, 5 S, 5 V; 325/16, 111, 117, 118, 352; 24/3 R, 3 A, 3 C, 3 F, 3 G, 3 H, 3 J, 3 L, 11 R

[56] References Cited

U.S. PATENT DOCUMENTS

| | | | |
|---|---|---|---|
| 3,370,236 | 2/1968 | Walker | 224/5 H |
| 3,631,994 | 1/1972 | Mackzum | 224/5 H |
| 3,956,701 | 5/1976 | James et al. | 224/5 H |

FOREIGN PATENT DOCUMENTS 225,019  11/1924  United Kingdom ................ 224/5 H

*Primary Examiner*—Trygve M. Blix
*Assistant Examiner*—Jerold M. Forsberg
*Attorney, Agent, or Firm*—Donald B. Southard; James W. Gillman

[57] ABSTRACT

A detachable mounting clip arrangement is disclosed especially suited for application with miniaturized radio apparatus or the like of the type intended to be worn on the person such as on a belt or in the shirt pocket. The clip arrangement includes a tapered base plate assembly designed to insert within a recess formed by two convergent undercut side walls on the apparatus housing itself and retained therein by a ratchet like serrated section included on the housing surface which interacts with a resilient finger extending laterally from the base plate. The base plate itself is designed to support a conventional pivotable mounting clip assembly and associated torsion spring.

3 Claims, 4 Drawing Figures

U.S. Patent    April 11, 1978    4,083,481
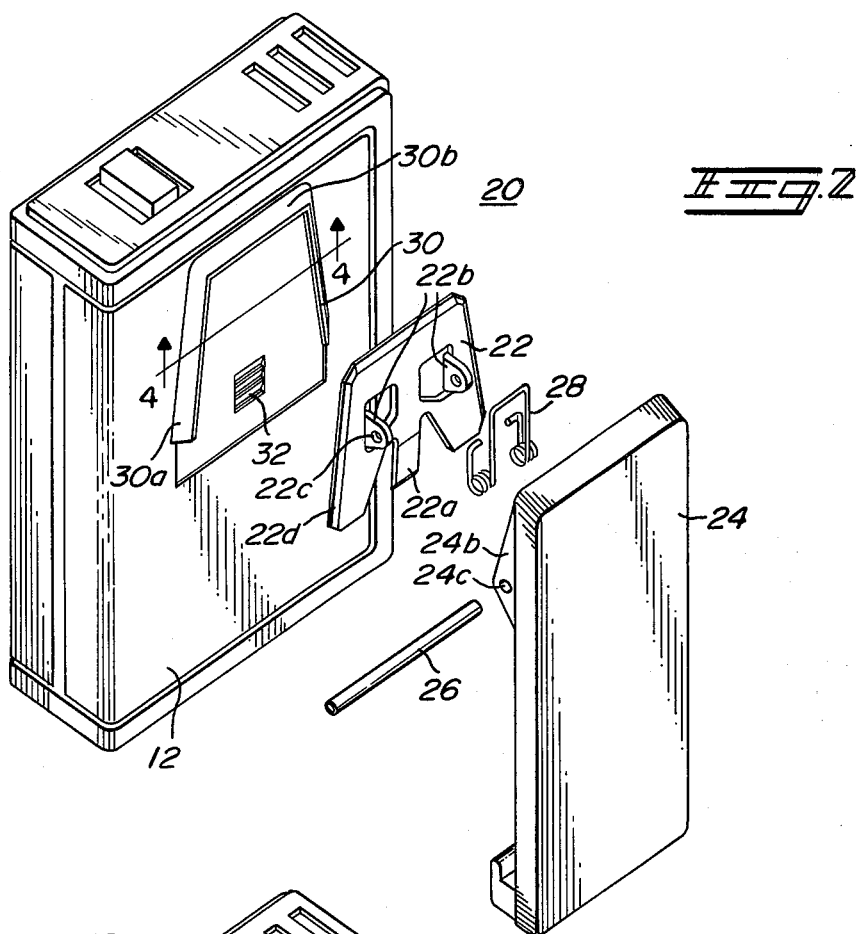
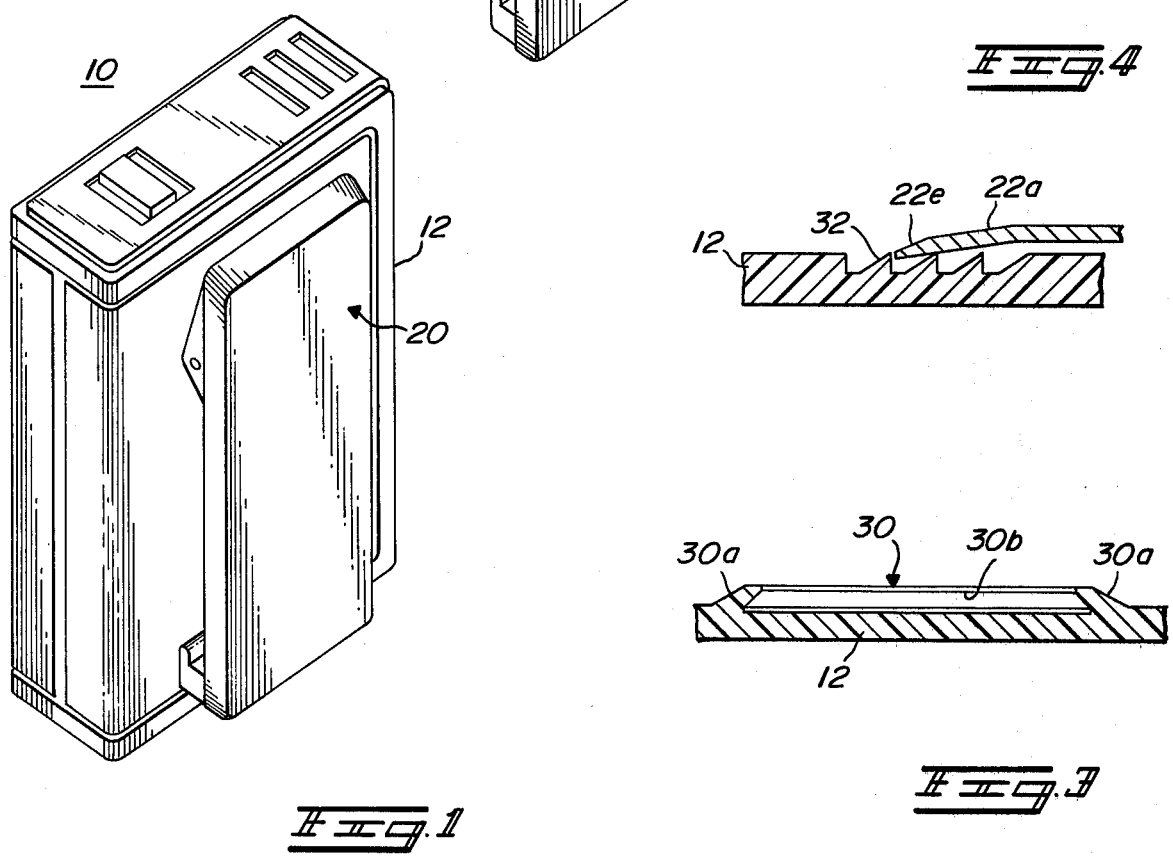

DETACHABLE MOUNTING CLIP ARRANGEMENT FOR MINIATURE PORTABLE APPARATUS OR THE LIKE

BACKGROUND OF THE INVENTION

The present invention relates generally to mounting clips and, more particularly, to a detachable mounting clip arrangement especially suited for use with personalized radio receivers which may be readily and conveniently detached therefrom as desired.

Personalized radio apparatus and other devices of this sort are intended to be worn on the belt or carried in a shirt pocket of the user. This requires a mounting clip arrangement of some sort whereby the portable apparatus can be securely attached to the belt or shirt pocket so as to avoid damage by inadvertent droppage thereof.

However, in some instances, the clip arrangement actually used is of a substantial bulk when compared to the radio housing itself and can cause a number of undesirable problems. For example, in servicing or maintenance operations, the clip assembly can become snagged in test leads of monitoring equipment or in other materials in close proximity. Then too, it creates a problem for battery charging equipment in that the entrance opening thereto is of a more complicated configuration than the otherwise rather simple rectangular opening if no clip assembly were included or protruding on the radio apparatus. In any event, with the size of the miniaturized or personal radio apparatus decreasing substantially in recent years, the size of the mounting clip becomes more and more prominent and, in many instances, less desirable.

SUMMARY OF THE INVENTION

Accordingly, it is an object of the present invention to provide a completely detachable mounting clip arrangement for personalized radio apparatus or the like.

A more particular object of the present invention is to provide a detachable mounting clip arrangement of the foregoing type which may simply and conveniently insert within a retainer lock ring and latch therein, but which may be removed by a simple tool when desired.

In practicing the invention, a detachable mounting clip arrangement is provided for releasable attachment to an associated miniaturized radio receiver or other portable apparatus and the like which includes projecting but convergent undercut side walls designed to accept a tapered base plate for retention therein and wherein a laterally extending resilient finger interfits with a serrated section on the apparatus housing to latch the base plate securely to the apparatus housing. The base plate includes means for supporting a conventional pivoted clip assembly which may be attached to the base plate by a simple locking pin and which may further support a torsion spring thereon. The clip assembly itself can be removed or otherwise detached from the housing by a simple tool prying up the resilient finger so as to release the tapered base plate from the recess with undercut side walls.

BRIEF DESCRIPTION OF THE DRAWINGS

The features of the present invention which are believed to be novel are set forth with particularity in the appended claims. The invention, itself, together with further objects and advantages thereof, may best be understood by reference to the accompanying drawings, in which:

FIG. 1 is a view in perspective of a typical personalized radio receiver apparatus which includes a mounting clip, which mounting clip arrangement being constructed in accordance with the present invention;

FIG. 2 is an exploded view of the mounting clip arrangement as shown in FIG. 1 illustrating the component parts thereof;

FIG. 3 is an enlarged, fragmentary view in cross-section of the raised ridge essentially along lines 4—4 as depicted in FIG. 2; and FIG. 4 is an enlarged, fragmentary view of a cross-section of the radio housing showing a serrated section thereon for engagement by the resilient finger of the base plate as shown in FIG. 2.

DESCRIPTION OF THE PREFERRED EMBODIMENT

Referring now to the drawings, a radio apparatus 10 is illustrated in FIG. 1 of the miniaturized or personal type intended to be carried by a user on his belt or in a shirt pocket. It is to be understood that the invention may be made applicable to a wide variety of miniaturized or other portable apparatus. In any event, a mounting clip arrangement indicated generallly at 20 is shown attached to the housing 12 of the radio apparatus 10, which clip arrangement has been constructed in accordance with the present invention.

As best seen in FIG. 2, the mounting clip arrangement 20 includes a base plate 22 and a conventional mounting clip 24 for attachment to base plate 22 by a connecting or lock pin 26. A torsion spring 28 is mounted on and supported by the pin 26 to provide the required spring bias for clip 24.

As illustrated, an upraised ledge or ridge 30 is provided on the housing 12 of apparatus 10 which is essentially open at one end thereof and is of a generally inverted U-shaped configuration. This ridge is formed by two convergent undercut side walls 30a and joined by a similar wall 30b at the narrower dimension or top, viewing FIG. 2, thereof. This provides a tapered recess or opening (see FIG. 3) within which to insert the base plate 22, itself having a similar or corresponding tapered configuration. The housing 12 further includes a series of serrations 32 on the housing body, the purpose of which will be described subsequently.

The base plate 22 includes the tapered body as previously mentioned of substantially the same dimension provided by side walls 30a so as to insert within and be retained by the retaining ridge 30 of housing 12. The base plate 22 further includes a centrally located finger or member 22a extending laterally in the same plane as plate 22 and a pair of upstanding projections 22b extending perpendicular to the plane of the base plate. Each of the projections 22b includes an opening 22c of substantially the same circular dimension as the pin 26 so as to receive the same therein by force fit. The base plate 22 further includes a beveled edge 22d along three sides thereof of substantially the same configuration as the angle of the undercut side walls 30a and 30b of the retaining ridge 30 on housing 12 (see FIG. 3).

In assembly, mounting clip 24 is attached to base plate 22 by aligning the openings 22c of the projection 22b on base plate 22 with the corresponding openings 24c in the projections or tab members 24b on clip 24 and the insertion therethrough of the locking pin 26 on which the torsion spring 28 is mounted. The entire assembly, i.e., interconnected base plate and clip, is inserted into the retainer ridge 30. The beveled edge portions 22d of base plate 22 operatively engage the inner, undercut surface of the leg portions 30a and 30b of ridge 30 (best seen in FIG. 3). Upon base plate 22 being fully inserted into engagement within retainer ring 30, the laterally extending finger portion 22a engages an appropriate one of the serrations 32 on housing 12 to thereby lock the assembly of base plate 22 and interconnected clip to the housing 12 of apparatus 10. As more clearly seen in FIG. 4, the finger member 22a includes a sharp beveled trailing edge 22e which engages one of the serrations 32 on the housing 12. The finger member 22a is prebent to a given configuration so as to conform to the inclination of the surface of the serrations 32. In any event, engagement by member 22a of the appropriate serration 32 locks the entire assembly within the retainer ridge 30 and the housing and the clip assembly are firmly attached to one another.

To detach the clip assembly 20, a simple blade tool or the like may be used to pry the resilient finger member 22a upwardly out of engagement with the associated serration 32 and the entire assembly may be withdrawn from the retainer ridge 30. No other tools are required or fasteners removed. Disassembly may be effected conveniently and quickly when desired. Reassembly may be as easy effected and even less time and effort.

While only a specific embodiment of the present invention is shown and described herein, it will, of course, be understood that other variations and modifications may be effected without departing from the true scope and spirit of the invention. The claims as appended hereto are intended to cover all such modifications and alternative constructions that may fall within the true scope and spirit.

Accordingly, what is claimed is:

1. A detachable mounting clip arrangement especially suited for use with a portable, hand-held apparatus to be worn on the person, including in combination:
   a housing;
   a raised ridge on said housing with undercut side walls forming a three-sided tapered recess open at one end, said housing further having a plurality of serrations displaced from said walls;
   a base plate dimensioned to insert within said undercut side walls of said raised ridge tapered recess and having a laterally extending resilient finger releasably engaging a selected one of said housing serrations to lock said base plate in engagement with said housing;
   an elongated mounting clip; and
   means for pivotably securing said mounting clip to said base plate.

2. A detachable mounting clip arrangement in accordance with claim 1 wherein the means for pivotably securing the mounting clip to the base plate includes a pair of upstanding projections on said base plate with a central opening therein and a corresponding pair of projections on said mounting clip having similar openings therein and a lock pin insertable in said openings of said projections on said base plate and mounting clip.

3. A detachable mounting clip arrangement in accordance with claim 2 wherein a torsion spring is mounted on said lock pin to provide a set spring bias for said mounting clip.

* * * * *